United States Patent [19]
Mason et al.

[11] Patent Number: 5,639,559
[45] Date of Patent: *Jun. 17, 1997

[54] PREPARATION OF CHLORITE

[75] Inventors: John Y. Mason, Plymouth; Dorm Matchim, Citrus Heights; Yan Wang, Davis, all of Calif.

[73] Assignee: Rio Linda Chemical Company, Inc., Sacramento, Calif.

[*] Notice: The term of this patent shall not extend beyond the expiration date of Pat. No. 5,597,544.

[21] Appl. No.: 506,862

[22] Filed: Jul. 25, 1995

[51] Int. Cl.$^6$ .................................................. C01B 11/10
[52] U.S. Cl. ............................................ 423/472; 423/147
[58] Field of Search ................................ 423/472, 197, 423/659; 252/187.23

[56] References Cited

U.S. PATENT DOCUMENTS

| | | | |
|---|---|---|---|
| 2,092,945 | 9/1937 | Vincent | 423/474 |
| 2,194,194 | 3/1940 | Cunningham | 423/472 |
| 2,332,180 | 10/1943 | Soule | 423/472 |
| 2,358,866 | 9/1944 | McMahon | 252/187.23 |
| 2,616,783 | 11/1952 | Wagner | 423/472 |
| 3,101,248 | 8/1963 | Hirschberg et al. | 423/472 |
| 3,450,493 | 6/1969 | Bellay et al. | 423/472 |
| 3,828,097 | 8/1974 | Callerame | 423/472 |
| 4,087,515 | 5/1978 | Miller | 423/472 |
| 4,247,531 | 1/1981 | Hicks | 423/477 |
| 4,590,057 | 5/1986 | Hicks | 423/477 |
| 5,204,081 | 4/1993 | Mason et al. | 423/478 |

FOREIGN PATENT DOCUMENTS

| | | | |
|---|---|---|---|
| 56-92102 | 7/1981 | Japan | 423/472 |
| 612615 | 11/1948 | United Kingdom | 423/472 |

*Primary Examiner*—Ngoc-Yen Nguyen
*Attorney, Agent, or Firm*—Leonard Bloom

[57] ABSTRACT

Process for the preparation of chlorite salts by the controlled reaction of chlorine dioxide with a reducing agent under reduced pressure to form chlorous acid. The chlorous acid is reacted with an aqueous solution of base to form the desired chlorite salt. The process is rapid, economical and is conducted in a generator which is significantly smaller than equipment currently used for production of chlorite salts.

11 Claims, 1 Drawing Sheet

PREPARATION OF CHLORITE

FIELD OF THE INVENTION

This invention relates to a process for the preparation of chlorite by the reaction of chlorine dioxide and a reducing agent to form chlorous acid and reaction under reduced pressure of the chlorous acid with an aqueous solution of a base.

BACKGROUND OF THE INVENTION

Chlorites are a class of reagent chemicals which have many commercial uses and many processes for preparation have been used. More recently, the method of choice has been by the reaction of chlorine dioxide, a reducing agent and an alkaline solution. The following U.S. Letters Patent disclose variations of this process:

| Inventor(s) | U.S. Pat. No. |
| --- | --- |
| Vincent | 2,092,945 |
| Cunningham | 2,194,194 |
| Soule | 2,332,180 |
| Wagner | 2,616,783 |
| Hirschberg et al | 3,101,248 |
| Du Bellay et al | 3,450,493 |
| Callerame | 3,828,097 |
| Miller | 4,087,515. |

Vincent discloses preparation of water soluble chlorites by reacting chlorine dioxide with an alkaline solution which contains a reducing agent.

Cunningham discloses preparation of chlorites by the reduction of chlorine dioxide with metallic reducing agents in the presence of an alkaline solution.

Soule discloses preparation of chlorites by the addition of chlorine dioxide to a solution of hydrogen peroxide in an alkaline solution made alkaline with an alkali metal bicarbonate.

Wagner discloses a process for preparing a solid chlorite by reacting chlorine dioxide in an alkaline solution containing a reducing agent, e.g. hydrogen peroxide.

Hirschberg et al disclose a process for the manufacture of alkali metal chlorides using a mercury amalgam reducing agent in a pH range maintained between pH 7–9.

Du Bellay et al disclose a process of producing alkali metal chlorites in which an alkaline solution of hydrogen peroxide reacts with chlorine dioxide which is bubbled therethrough to yield an alkali metal chlorite. Measurements of redox potential and pH are made, and the reactants are added to a reaction vessel based on the redox and pH measurements.

Callerame discloses a process for preparation of chlorous acid that involves a reaction of a chlorate with a nitrite in a column containing a cation exchange resin.

Miller discloses a process for the production of alkali metal chlorites that involves a reaction of chlorine dioxide with alkali metal amalgams under an atmosphere of nitrogen gas.

All of these above processes are conducted at atmospheric pressure or at a pressure greater than atmospheric pressure.

In those references which use chlorine dioxide, alkali and peroxide, the chlorine dioxide is added to the solution containing peroxide and alkali and the reaction takes place in solution.

One preferred commercial method of manufacturing sodium chlorite starts with the electrochemical formation of sodium chlorate. The sodium chlorate is reduced to form chlorine dioxide. Sodium hydroxide having a low iron content is dissolved in water and cooled to a temperature of approximately 40° F. In the process, hydrogen peroxide is added to the sodium hydroxide solution while maintaining the temperature of the reagents to about 35°–40° F. The gaseous chlorine dioxide is then added to the solution of sodium hydroxide and hydrogen peroxide while maintaining a solution temperature of approximately 35°–40° F. The control of the temperature is critical because at room temperature and warmer, the peroxide decomposition in caustic is accelerated and the process rapidly loses efficiency. A disadvantage with this method is the size of the equipment required to produce the chlorite. A reaction in solution (liquid/liquid) involves large volumes to be commercially useful. The kinetics of a liquid/liquid reaction requires a finite time to permit the reaction to be initiated and to proceed to completion. Thus, the solutions must be held in large tanks or holding vessels. Typically, the equipment occupies a volume of approximately 10,000–15,000 cubic feet depending on the plant capacity. Also, the equipment is expensive to procure, install and maintain.

Thus, despite the wide-spread use of these chemicals and the efforts of numerous investigators over a period of years, the commercial production of chlorite is comparatively expensive, requiring large equipment, significant land area, maintenance, large volumes of in-process liquids, and special temperature conditions. A need exists to simplify the process and provide a more economical product.

SUMMARY OF THE INVENTION

Accordingly, it is a primary object of the invention to alleviate the problems and disadvantages of the prior art by providing small commercially available equipment wherein the reaction to produce chlorite occurs under reduced pressure.

It is another object of the present invention to react gaseous chlorine dioxide with a reducing agent in the vapor phase to form chlorous acid under reduced pressure, the chlorous acid being reacted with an aqueous base solution to form chlorite in high yield.

It is a further object of the present invention to provide a process for production of chlorite salts which has rapid start-up and shut-down times.

In accordance with the broad teachings of the present invention, there is herein illustrated and described a process for the preparation of chlorite salts. Chlorine dioxide and a reducing agent are reacted under reduced pressure in a reaction chamber to form chlorous acid, the chlorous acid being reacted with an aqueous solution of a base to form the chlorite salt. A vacuum eductor having an inlet, an outlet, a venturi nozzle and a venturi throat, is provided. The reaction chamber is in fluid communication with the vacuum eductor. The aqueous solution of the base is introduced into the inlet of the vacuum eductor to produce a vacuum within the reaction chamber. The chlorine dioxide and the reducing agent are introduced substantially simultaneously into the reaction chamber wherein the chlorine dioxide and reducing agent react substantially instantaneously to form the chlorous acid. The chlorous acid is drawn by the vacuum into the vacuum eductor, the chlorous acid reacting with the aqueous solution of the base to form the chlorite salt. The chlorite salt solution passes through the venturi throat.

The base may be sodium hydroxide and the reducing agent may be hydrogen peroxide.

DESCRIPTION OF THE PREFERRED EMBODIMENT

Figure 1:
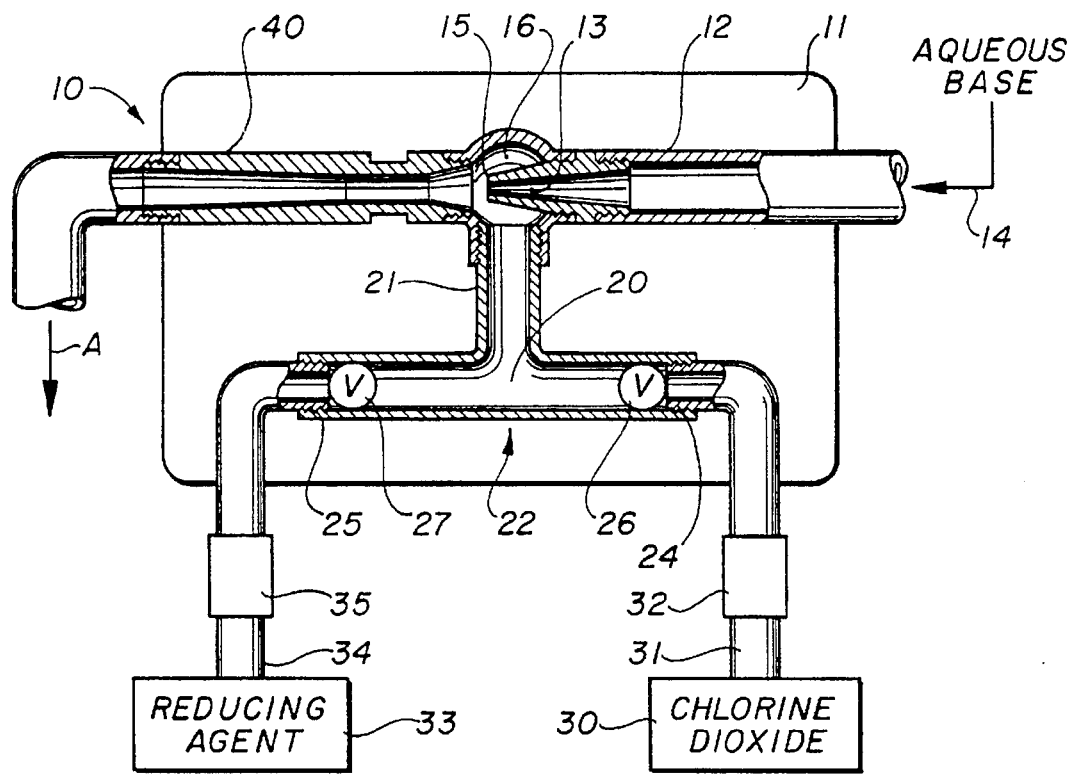
FIG. 1 illustrates an apparatus wherein the reaction is conducted to prepare the chlorite salts.

The apparatus for preparation of the chlorite salts is substantially the generator 10 disclosed in U.S. Pat. No. 4,590,057 issued to Hicks (FIG. 1).

The generator 10 is small and may be mounted on a mounting backing or support means 11. The vacuum eductor 12 has an inlet 14, an outlet 16, a venturi nozzle 18 and a venturi throat 20.

An aqueous solution of base 22 is introduced into the inlet 14, passes through the venturi nozzle 18, through the venturi throat 20, and exits from the outlet 16 of the vacuum eductor 12. In this manner, a reduced pressure zone (vacuum) is produced in the reaction chamber 24.

The reaction chamber 24 is in fluid communication with the vacuum eductor 12 and is adjacent to the venturi nozzle 18. The reaction chamber 24 may be in the shape of a "T", an inverted "F" or other shapes. The reaction chamber 24 has two inlets 26, 28 formed thereon. Each inlet 26, 28 has a respective valve 30,32 therein. The valves 30, 32 seal the reaction chamber 24 from the environment and also control the introduction of reactants into the reaction chamber 24.

A source of chlorine dioxide 34 is connected to the valve 30 in the first inlet 24 of the reaction chamber 24 through a conduit 36 having a flow control device 38 such as a rotameter therein. Preferably, the chlorine dioxide is provided as a gas. A source of reducing agent 40 is connected to a second conduit 42 having a second flow control device 44 therein. The second conduit 42 is connected to the second valve 32 in the second inlet 28 of the reaction chamber 24. The chlorine dioxide and reducing agent are intimately and rapidly mixed in the reaction chamber 24 to form chlorous acid substantially instantaneously. The chlorous acid is drawn into the vacuum eductor 12 due to the reduced pressure. The chlorous acid reacts with the base to form chlorite as the aqueous base solution 22 exits from the venturi nozzle 18. The chlorite and any unreacted chlorine dioxide, reducing agent and/or solution of base pass through the venturi throat 20 and exit from the generator 10 as shown by the arrow A.

Figure 2:
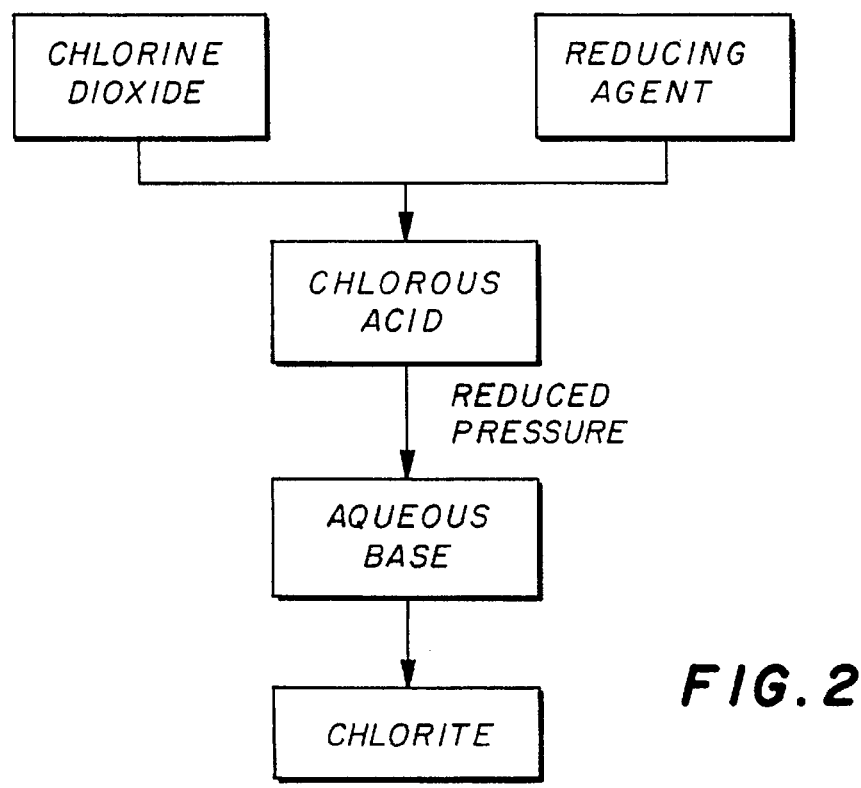
FIG. 2 illustrates a diagrammatic flow chart of the process of the present invention.

The process is shown in FIG. 2.

The apparatus as disclosed in the Hicks patent is commercially available, relatively inexpensive and is comparatively small, having a volume of approximately 480 cubic feet for 12 ton/day of chlorine dioxide production. The volume of the device varies depending on the capacity of the apparatus. As disclosed by Hicks and as utilized commercially, the generator is used for the production of chlorine dioxide. There has been no disclosure or suggestion that chlorine dioxide be one of the reactants introduced into the generator or that the generator be used for the preparation of chlorite.

The process of the present invention can be performed efficiently with a wide variety of aqueous solutions of base. These include, but are not limited to, sodium hydroxide, potassium hydroxide, calcium hydroxide, sodium carbonate (soda ash), sodium bicarbonate, ammonium hydroxide, etc. The cation (e.g. sodium, potassium, calcium, ammonium) of the base will become the cation of the chlorite salt so that the present invention can be used to prepare a desired chlorite salt. Based on economic factors and reactivity, the preferred base is sodium hydroxide. Typically, sodium hydroxide in concentrations of approximately 25%–50% are used. The preferred concentration of sodium hydroxide introduced into the inlet 14 is 30%.

Any desired reducing agent may be used. In a preferred embodiment, hydrogen peroxide is used because of its ready availability and comparatively lower cost than the other reducing agents. Typically, hydrogen peroxide in concentrations of approximately 30%–70% are used, the preferred concentration being approximately 50%.

Chlorine dioxide from any source may be used in the process of the present invention. The chlorine dioxide may be in an aqueous solution, however for greater efficiency, gaseous chlorine dioxide is preferred. The gaseous chlorine dioxide need not be dry but may be admixed with a small amount of moisture. Since chlorine dioxide in the gaseous state is susceptible to explosive decomposition at concentrations above 10% in air, these concentrations are typically not used. Any concentration less than 30% may be used in the present invention.

As previously noted, the cited references which disclose the formation of chlorite from chlorine dioxide, alkali and peroxide (reducing agent) have all added the peroxide to the alkaline solution prior to the addition of the chlorine dioxide. One of the major reasons for this sequence of reactions is for safety since the reaction between chlorine dioxide and the reducing agent (peroxide), if not properly controlled, is extremely vigorous and potentially explosive. The conventional procedure requires the mixing of the chlorine dioxide with aqueous solutions of base and reducing agent wherein a liquid phase reaction occurs to form chlorous acid and chlorite. This necessitates large reaction equipment for the large volumes involved and to permit the solubilizing of the reactants. The liquid phase reaction is slower than the present invention. The reactants must intimately intermix throughout the liquids in a chemical liquid/liquid reaction. When this reaction sequence is adapted to commercial production of chlorite, the reagents and solution must be maintained at a temperature of less than 77° F. As the temperature of the reactants increase, there is an increased rate of breakdown of the peroxide in the alkaline medium and the overall reaction becomes less efficient. As a result of these factors, the current commercial process of preparation of chlorite requires equipment which occupies approximately 10,000–15,000 cubic feet and consumes additional power for cooling.

The process of the present invention, on the other hand requires equipment which is significantly smaller, occupying approximately 480 cubic feet for equivalent capacity, which results in savings in capital equipment, operating and maintenance costs. This savings is achieved by the controlled reaction of chlorine dioxide with the reducing agent (peroxide) to form chlorous acid followed by an almost instantaneous reaction of the chlorous acid with the solution of base to form the chlorite. The controlled reaction of chlorine dioxide with peroxide is conducted in the generator disclosed by Hicks. Due to the reduced pressure in the reaction chamber 24, the reducing agent is volatilized or formed as a mist. Preferably, the chlorine dioxide is in the gaseous state. Thus, a gas/gas reaction or a gas/liquid reaction takes place within the reaction chamber 24. The rate of reaction is determined by the mixing of the gases and is significantly more rapid than the liquid/liquid reaction disclosed in the cited references. The generator 10 provides a reaction chamber 24 sized to permit the substantially instantaneous reaction in less than approximately 0.1 second. The chlorous acid so produced is substantially instantaneously drawn into the vacuum eductor 12 at the venturi nozzle 18 by the reduced pressure. At this point the chlorous acid reacts with the base solution 22 to form the desired chlorite which passes through the venturi throat 20. Any unreacted starting materials and byproducts of the reaction are also passed out of the generator 10. This reaction sequence is:

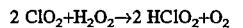

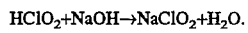

A yield of 90–95% of chlorite based on the amount of chlorine dioxide can be obtained.

Since peroxide and chlorine dioxide are premixed and reacted in the reaction chamber to form the chlorous acid almost instantaneously, (a) there is minimum residence time in which the peroxide can break down before reacting and losses are reduced, (b) the reaction between peroxide and chlorine dioxide takes place in the reaction chamber, and it is not necessary to maintain any peroxide in a solution phase such that losses are minimized, (c) temperature of the reactants in the reaction chamber is controlled by controlling the temperature of the reactants (e.g., the chlorine dioxide and the peroxide) and also by controlling the temperature of the solution of base. This minimizes losses due to break down of reactants or products. As a net result, the generator of the present invention is approximately 30 times smaller in volume than the equipment of the equivalent capacity currently used in production of chlorite salts.

A further advantage of the present invention is that the production of the chlorite salts can be initiated and terminated with virtually no delay. Interruption or termination of the flow of the solution of base 22 into the vacuum eductor 12 approximately instantaneously terminates the process since the source of vacuum is eliminated. Thus, the chlorine dioxide and reducing agent are not drawn into the reaction chamber 24 and the reaction ceases. Alternately, to approximately instantaneously terminate the process, the supply of chlorine dioxide and/or reducing agent can be interrupted by closing the respective values 30, 32. The nature of the gas/gas reaction permits this control. This degree of control provides a safer work environment. Contrary thereto, the prior art procedures using liquid/liquid reactions cannot be initiated and terminated until all of the reagents in the large volume of liquid have an opportunity to interact (for initiation) or have all been reacted (for termination). The operator cannot "fine tune" the reaction.

The foregoing description relates to embodiments of the invention which have been set by way of example, not by way of description. It is to be understood that numerous other embodiments and variants are possible without departing from the spirit and scope of the invention, its scope being defined by the appended claims.

What is claimed is:

1. A process for the preparation of chlorite salt, comprising the steps of providing a vacuum eductor having an inlet, an outlet, with a venturi therebetween, the venturi having a venturi nozzle and a venturi throat; a reaction chamber being in fluid communication with vacuum eductor; introducing an aqueous solution of a base into the inlet of the vacuum eductor; to produce a vacuum within the reaction chamber; introducing chlorine dioxide and a reducing agent substantially simultaneously into the reaction chamber wherein the chlorine dioxide and the reducing agent react substantially instantaneously to form chlorous acid, the chlorous acid being drawn by the vacuum into the vacuum eductor, reacting the chlorous acid with the aqueous solution of the base thereby forming the chlorite salt, the chlorite salt solution passing through the venturi throat.

2. The process of claim 1, wherein the base is sodium hydroxide.

3. The process of claim 1, wherein the chlorine dioxide is a gas.

4. The process of claim 1, wherein the chlorine dioxide is in an aqueous solution.

5. The process of claim 1, wherein the reducing agent is hydrogen peroxide.

6. The process of claim 1, wherein the process is terminated approximately instantaneously by the step of terminating the introduction of base into the inlet of the vacuum eductor.

7. The process of claim 1, wherein the process is terminated approximately instantaneously by the step of terminating the introduction of the chlorine dioxide and the reducing agent into the reaction chamber.

8. The process of claim 1, wherein the chlorine dioxide and the reducing agent react in less than approximately 0.1 sec. to form the chlorous acid.

9. A process for the preparation of chlorite salts comprising the steps of intimately and rapidly premixing chlorine dioxide with a reducing agent under vacuum to substantially instantaneously form chlorous acid and subsequently adding the chlorous acid to an aqueous solution of a base to form the chlorite salt.

10. The process of claim 9, wherein the reducing agent is hydrogen peroxide.

11. The process of claim 9, further comprising providing a vacuum eductor to produce the vacuum.

* * * * *